March 27, 1962 H. W. SACKS 3,027,273
SPRAY CONTROL SYSTEM
Filed Dec. 16, 1957 5 Sheets-Sheet 1

INVENTOR.
HENRY W. SACKS
BY
Oberlin & Limbach
ATTORNEYS

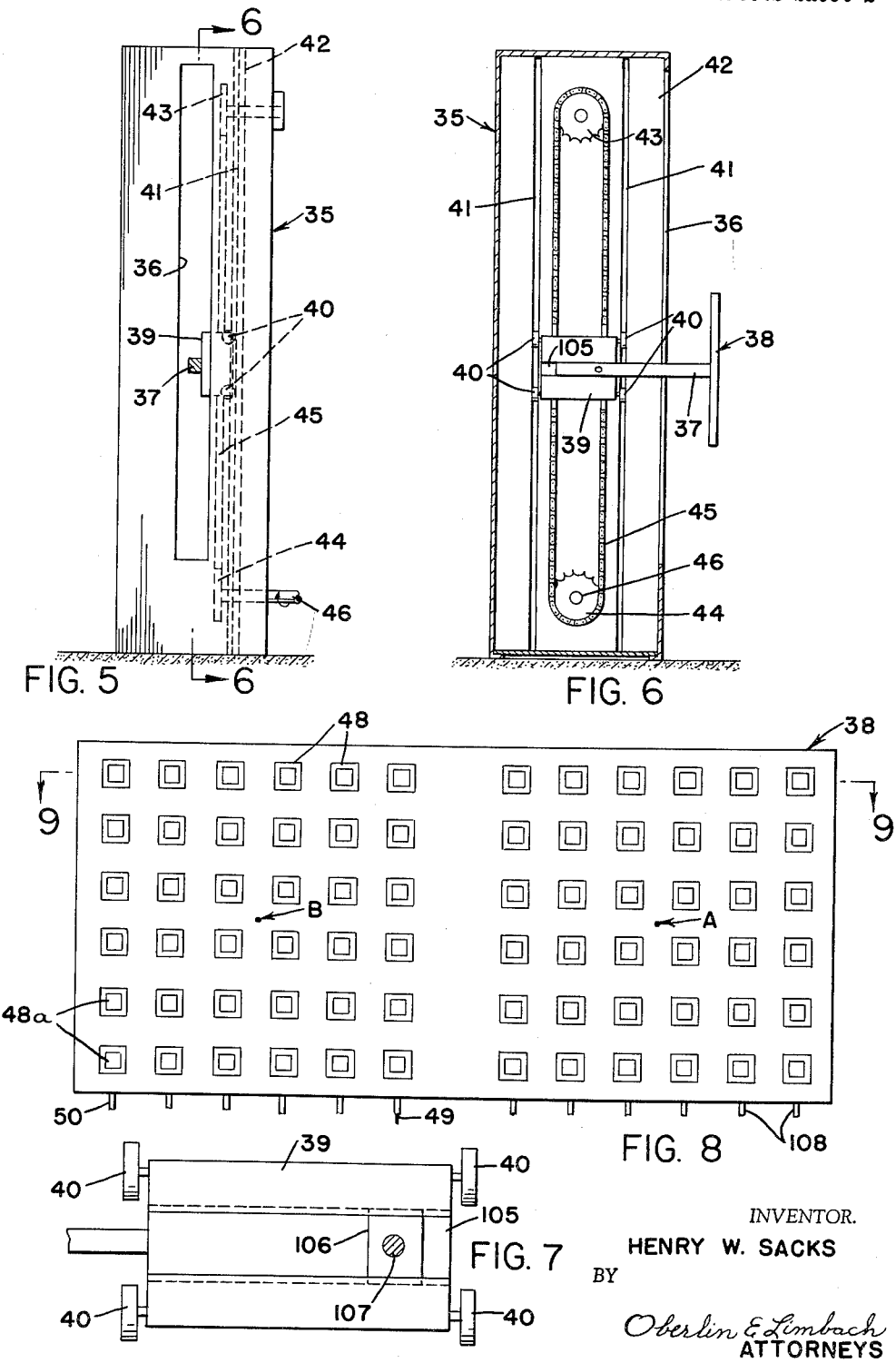

March 27, 1962  H. W. SACKS  3,027,273
SPRAY CONTROL SYSTEM
Filed Dec. 16, 1957  5 Sheets-Sheet 3
FIG. 9
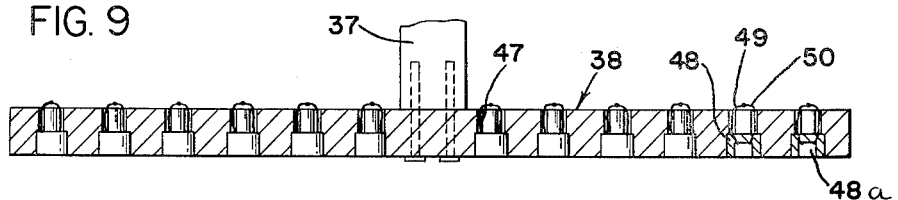
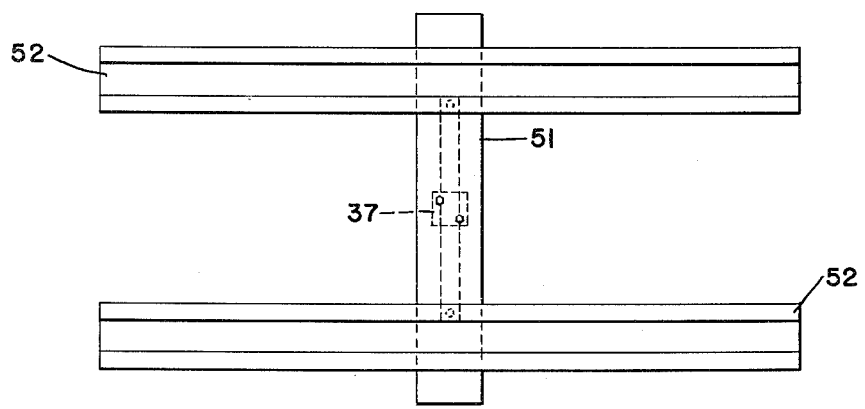
FIG. 10
FIG. 11
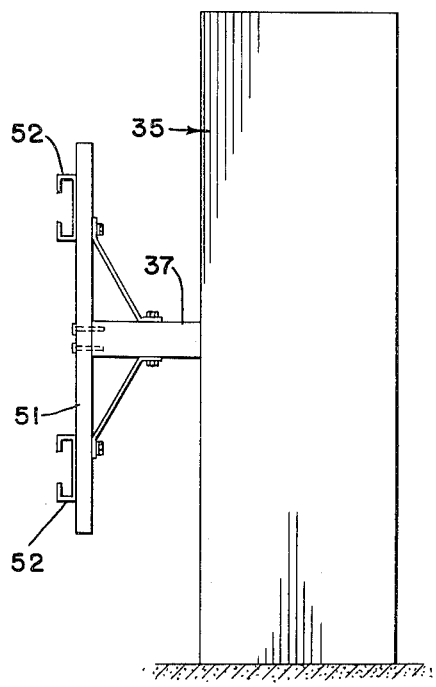
FIG. 12
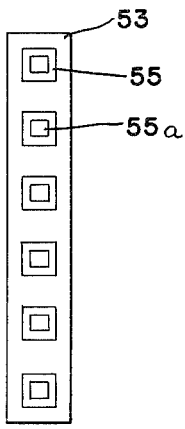
FIG. 13
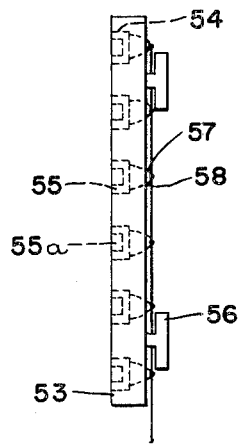
INVENTOR.
HENRY W. SACKS
BY
Oberlin E. Limbach
ATTORNEYS

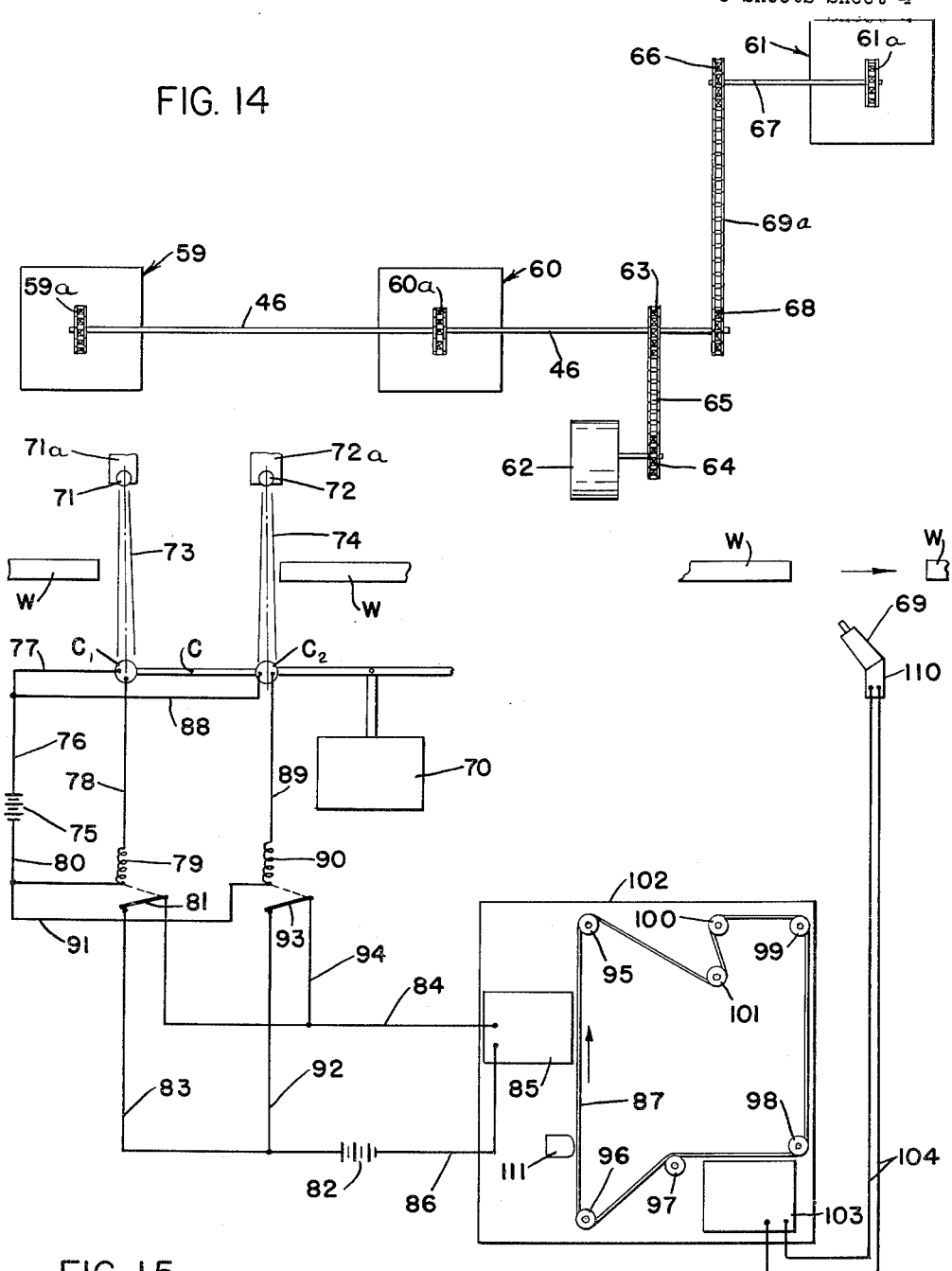

March 27, 1962 H. W. SACKS 3,027,273
SPRAY CONTROL SYSTEM
Filed Dec. 16, 1957 5 Sheets-Sheet 5

INVENTOR.
HENRY W. SACKS
BY
*Oberlin & Limbach*
ATTORNEYS

# United States Patent Office 3,027,273
Patented Mar. 27, 1962

3,027,273
SPRAY CONTROL SYSTEM
Henry W. Sacks, Cleveland, Ohio, assignor to The E. F. Hauserman Company, Cleveland, Ohio, a corporation of Ohio
Filed Dec. 16, 1957, Ser. No. 703,147
19 Claims. (Cl. 117—104)

The present invention relates to a spray control system and, more particularly, to a method and apparatus for positively providing a predetermined amount of overspray to paint effectively all areas of a workpiece without undue waste, regardless of the size of the workpiece or of successive workpieces.

Normally, in commercial automatic spray painting a series of articles or workpieces are moved substantially in line past one or more spray guns. At an appropriate time the guns are fired, as by compressed air, to atomize paint supplied to the guns into cone-shaped sprays which are directed onto the workpiece. In order to apply the paint evenly and in a correct manner for good coverage, the gun or guns are mounted in an angular direction with respect to the moving line of workpieces and vertically or horizontally reciprocated. The stroke of travel of the spray gun ordinarily extends beyond the boundaries of the workpiece to insure that the edges of the workpiece are covered as well. Obviously not all of the discharge paint reaches the workpiece under these conditions, and that which passes the workpiece or ricochets from it is termed "overspray."

This system of spray painting is subject to several objections. As an instance, the overspray represents a financial loss. While some overspray is unavoidable to insure complete painting, as indicated, the actual amount of overspray can in many instances reach excessive proportions. Further, additional problems are presented when a three dimensional workpiece or object, that is, an article having angularly related surfaces, is to be painted in contrast to a planar or two dimensional surface. In the latter instance one or more spray guns, mounted on a machine which traverses the guns transversely of the path of travel of the workpieces, can be directed perpendicularly to such path of travel with fairly efficient results. In the three dimensional type of workpiece, however, experience has shown that the spray guns must be angled obliquely to the line of work movement and also angled obliquely from the horizontal in order effectively to paint all surfaces such as flanges, curved edges, and the like which do not lie in the main plane of the workpiece. Thus the problem is accentuated in that in spray painting a three dimensional type of workpiece, all plane surfaces parallel to the line of work movement and all surface perpendicularly and/or obliquely disposed to it must receive complete and uniform coverage.

Additionally, when quantity runs of workpieces having the same size and shape are made, conventional methods and apparatus can be adapted to exhibit fairly high efficiencies of paint application. However, when objects vary in size and shape, particularly in successive objects, the efficiencies seriously decrease with attendant increase of overspray because of irregular voids between the workpieces and voids within a workpiece, for example, door frames, window openings, and the like.

A still further problem encountered with spray painting is that a W pattern left by a reciprocating spray gun sometimes results in missed bare areas. When there is accurate control of the times of operation of the gun and/or the relative speeds of movement between the gun and a workpiece, and particularly a control on the initial firing of the guns, such bare areas can be avoided.

Attempts have been made previously to control the operation of spray guns as a function of the presence or absence of portions of the sprayed articles directly underneath the paint of the gun. For example, a fixed detection system controlling the application of material to articles at a point directly above a detecting member is shown in Patent No. 441,991.

Again in Patent No. 2,565,655, an arrangement is disclosed in which a detector moves with or as a function of the movement of a spray gun carrier. The signals established by the detector are applied to a moving strip of tape in the form of perforations. The perforations are later used to energize a system controlling the firing of spray guns.

Also in Patent No. 2,754,795, a number of fixed-positioned feelers establish electric signals which are recorded on a recording tape. A "pick-off" head operates a battery of spray guns in accordance with the recorded signals of the tape.

The present invention obviates the previously described objections to commercial spray painting and improves upon the systems of the cited patents. In general, it is an object to trace and transmit the boundaries or outline of a workpiece to be painted to spray gun controls by means of a reciprocating reference point corresponding in position to a spray gun. The reference point has activating or sub-reference points spaced therefrom which sense or detect the passage of a workpiece. The workpiece is accordingly completely and effectively painted by the combined actions of the reference point and spray gun, regardless of the shape of the workpiece or of successive workpieces, and with a calculated limited amount of overspray, both horizontally and vertically, with respect to a moving workpiece.

It is, therefore, a principal object of the invention to provide an improved method and apparatus for spray painting.

Another object is to provide a method and apparatus for spray painting having a controlled amount of overspray.

A further object is to provide a method and apparatus adapted to spray paint a succession of workpieces having different sizes and shapes.

A still further object is to provide a scanner or sensing device for detecting a workpiece and for firing a spray gun in accordance with the detections.

A still further object is to provide a scanner or sensing device having adjustably positioned detector elements to vary the time of firing a spray gun.

Further objects will become apparent as the description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In the annexed drawings:

FIGURE 5 is a front view of mechanical means for reciprocating the scanner device, the scanner plate being removed for purposes of illustration;

FIGURE 6 is a section of FIGURE 5 on the line 6—6;

FIGURE 7 is a side elevational view of a carrier of the apparatus of FIGURE 6 showing a slide connection for the carrier to a driving link chain;

FIGURE 8 is a front view of a plate of a scanner device having activating or sub-reference points;

FIGURE 9 is a section of FIGURE 8 on the line 9—9;

FIGURES 10 and 11 are front and side views, respectively, of a modified form of scanner device;

FIGURES 12 and 13 are front and side views, respectively, of a strip having activating or sub-reference points and insertable in the scanner of FIGURES 10 and 11;

FIGURE 14 is a plan, semi-schematic diagram of a mechanical drive arrangement for synchronizing the movement of the scanner device with that of spray guns;

FIGURE 15 is a schematic circuit diagram showing how the scanner device controls the firing of spray guns through the recordation of electrical impulses or signals.

General Description

Figure 16:
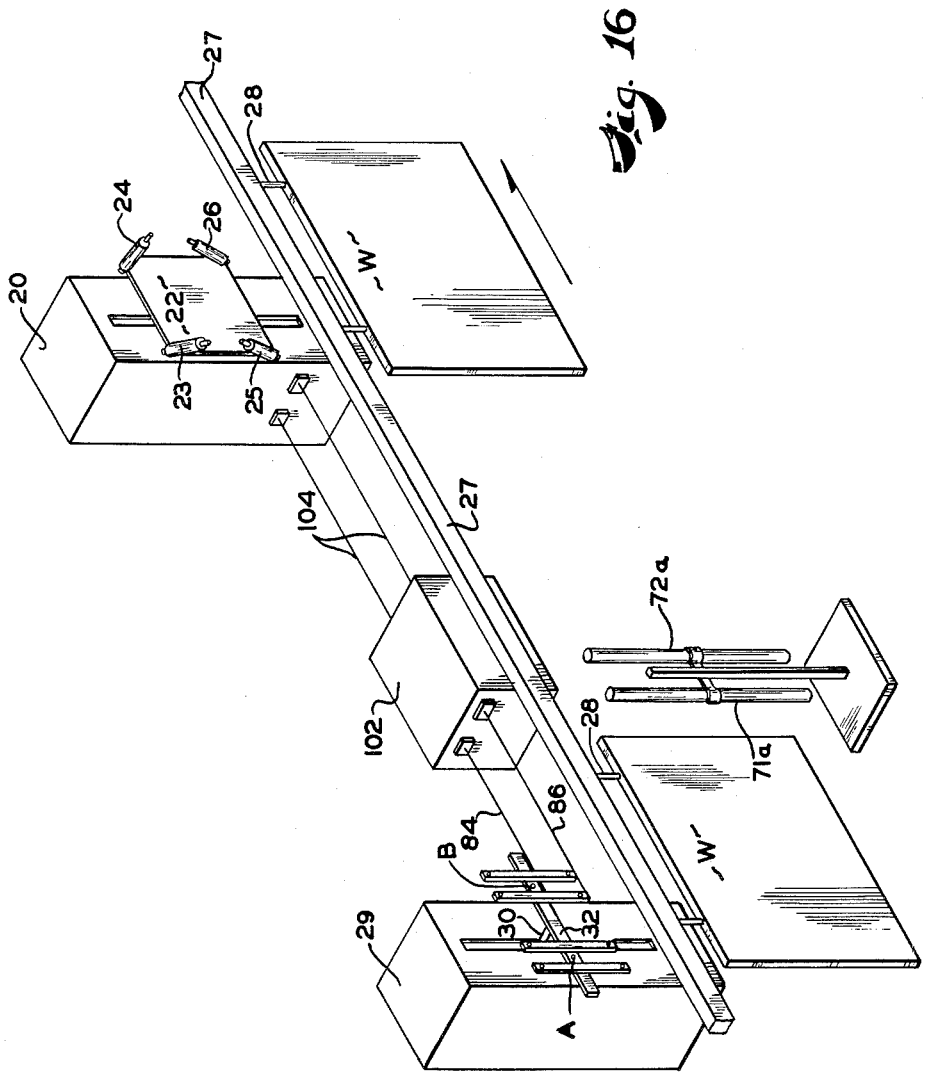
FIGURE 16 is a perspective, semi-diagrammatic view of one complete embodiment of the invention.

In general, the present invention contemplates spray painting a workpiece such as a frame, panel, partition, strip or the like, with or without openings, and with or without flanges or relatively wide edges, by reciprocating a main reference point in synchronism with the angled movement of a spray gun, both the point and gun being so moved with respect to a train of workpieces traveling seriatim along a path adjacent the gun. This reference point has the same relative position with respect to the workpieces as the spray of the gun and is carried by a scanner or detector device stationed to one side of the path of travel of the workpieces and ahead of the spray gun (note FIGURE 16).

The scanner carries a number of activating or sub-reference points which are spaced from the main reference point. These activating points detect the presence of a passing workpiece. The detections, in turn, may be converted to signals which are applied to a strip of tape in the form of perforations in the manner of cited Patent No. 2,565,655 or recorded as electrical signals on a tape in the manner of cited Patent No. 2,754,795. In either event, the recorded detections are used to operate a spray gun when the detected workpiece reaches it, so that the gun begins firing ahead of the workpiece to provide a calculated "lead" overspray, as determined by the first activating point passed, and continues to fire to provide a predetermined "holdover" overspray, as determined by the last activating point passed. Because of the mutual, synchronous movement of the scanner device and the gun, such activating points provide as well for vertical overspray above and below a workpiece in the same manner. Thus, only the size and shape of the workpiece determines the sequence and length of firing a spray gun and automatically accounts for a predetermined amount of overspray.

More particularly, when several sets of spray guns, mounted on a vertically traversing machine, are angularly directed efficiently to coat all surfaces parallel to the line of work movement and those perpendicular and/or obliquely disposed to it, actuation of the first set of guns, nearest to the incoming work, must take place some time prior to the work's entering the actual spraying area. This is necessary to effectively coat the incoming flange of the workpiece. This distance of gun actuation may be termed leading horizontal overspray. It follows that a similar distance of trailing horizontal overspray must be allowed for the leaving or trailing flange and overspray as well for flanges or the like at the top and bottom of the workpiece which may be termed top and bottom vertical overspray, respectively. Instead of vertical reciprocation, it will be apparent that the spray guns may reciprocate in a horizontal plane and over a series of workpieces.

To achieve efficient paint coverage of a workpiece, complete flexibility of overspray adjustments is necessary. Leading horizontal, trailing horizontal, top vertical, and bottom vertical oversprays must be independently adjustable. To provide for this flexibility, a series of activating or sub-reference "points," are stationed with, and adjustable in horizontal and vertical distances from, a central or reference "point." The activating points are capable of actuating a solenoid of a spray gun and, with the central or main reference point, are mounted on the reciprocating arm of a scanning unit. The activating points receive a wave or beam of energy such as light which impinges upon the scanning unit. The interception of the wave or beam by the contours of a workpiece creates signals that are transmitted to the actuating means of the spray guns. The spray guns thereby act only on the surfaces intercepting the wave or beam, and in such a manner as to provide horizontal and vertical overspray corresponding to the horizontal and vertical distances of the activating points from the main reference point. In a normal four gun installation on a vertically reciprocating transverse machine, each set of two guns, positioned substantially in the same vertical plane, is actuated by a single solenoid. Therefore, two sets of scanning "points" are usually used, one set for each solenoid.

Figure 1:
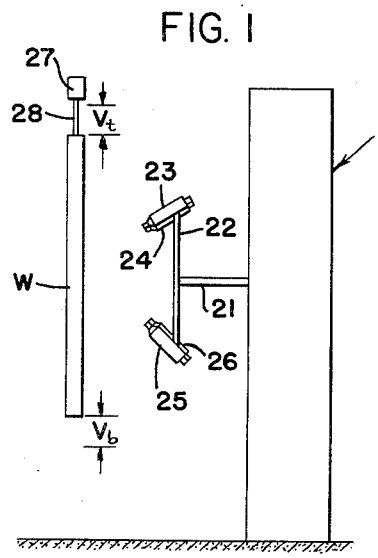
FIGURES 1 and 2 are side and plan views, respectively, of spray guns adapted to be controlled in accordance with the present invention to provide the indicated amounts of vertical and horizontal overspray.
Figure 2:
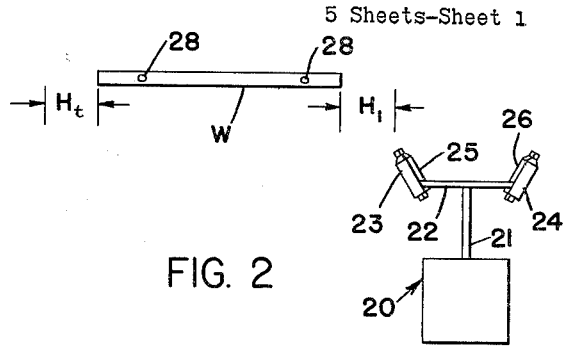

Referring to FIGURES 1 through 4, a conventional spray gun apparatus includes a machine 20 for vertically reciprocating a set of four guns by means of a rod 21 and support 22. All of the guns are angled away from the support or plate 22 as shown in FIGURE 2, and in addition the top guns 23 and 24 are angled downwardly and the bottom guns 25 and 26 are angled upwardly as shown in FIGURE 1. The guns are preferably aligned horizontally and vertically in the general positions shown, but in FIGURES 1 and 2 the guns are illustrated somewhat displaced from each other for purposes of illustration. Actually, the number of guns is not critical to the invention, but a gang is usually employed to effect proper and sufficient coverage of all areas on the workpiece. Moreover, guns like guns 23 and 25 are aimed at the same spot so that their cone-shaped sprays overlap and may actually be superposed. In such an instance, guns 23 and 25 behave as though they were one gun and may be so treated with respect to a reference point and its sub-reference points. The same is true with respect to guns 24 and 26. A conveyor 27 carries a series of workpieces W past the spray guns on hangers 28.

In accordance with the present invention, the extent of the top vertical overspray $V_t$ is the distance determined by the period of time the guns and particularly the top guns 23 and 24 must remain firing to coat the top portion of a workpiece W such as a top flange; the bottom vertical overspray $V_b$ represents the distance the guns and especially the bottom guns 25 and 26 must be actuated to coat a bottom portion or flange; the leading horizontal overspray $H_l$ represents the distance before the incoming flange of a workpiece W during which the top and bottom guns 23 and 25 must be actuated to coat the flange; and the trailing horizontal overspray $H_t$ represents the distance from the trailing flange of a workpiece through which the top and bottom guns 24 and 26 must remain in operation to coat that flange.

Figure 3:
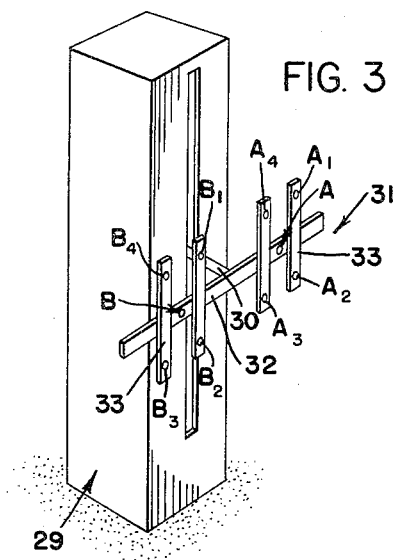
FIGURE 3 is a diagrammatic, perspective view of a scanner device of the present invention.
Figure 4:
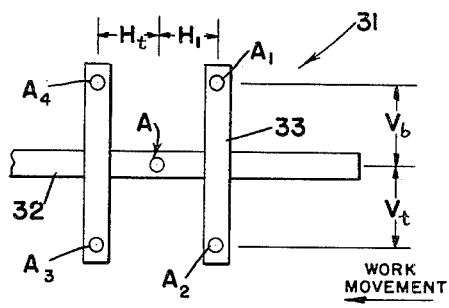
FIGURE 4 is a front view of the right-hand end of the scanner device of FIGURE 3.
Figure 4A:
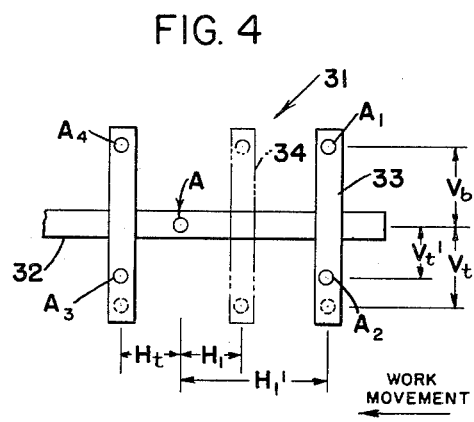
FIGURE 4A is a view similar to FIGURE 4, illustrating how the detector or sub-reference points can be adjustably positioned.

FIGURES 3, 4 and 4A illustrate a scanning device of the present invention and its manner of detection. A machine 29 vertically reciprocates a rod 30 in the manner of machine 20. The scanning device indicated generally at 31 includes a main cross bar 32 and four smaller cross bars 33 which are fixed angularly to the cross bar 32. The point A on bar 32 is the main reference point for guns 23 and 25, while the point B on cross bar 32 is the main reference point for guns 24 and 26. These points A and B occupy the same position with respect to the workpieces W as the sprays of paint from the corresponding gun-sets. Thus, assuming guns 23 and 25 have superposed congruent spray patterns, the effective position of the main reference point A is comparable to a point in vertical alignment with guns 23 and 25 and at the level of the rod 21. The same is true for main reference point B with respect to guns 24 and 26.

Spaced from each main reference point are four sub-reference or activating points as indicated by the reference characters $A_1$ through $A_4$ and $B_1$ through $B_4$. These points detect the presence of a workpiece and cause a spray gun ultimately to be fired in a manner hereinafter indicated. The points $A_1$ and $A_2$ control the leading horizontal overspray and top and bottom vertical overspray of the gun set consisting of guns 23 and 25; the points $A_3$ and $A_4$ control the trailing horizontal overspray and top and bottom vertical overspray of the same gun set; points $B_1$ and $B_2$ control the leading horizontal overspray and the top and bottom vertical overspray of the second gun set consisting of guns 24 and 26; and points $B_3$ and $B_4$ control the trailing horizontal overspray and the top and bottom vertical overspray of the second gun set.

By adjustably positioning the activating points of FIGURE 4, the firing of the spray guns can be altered to provide a very flexible arrangement. Changes of this type may be made when the speed of the workpieces W is too fast for the vertical reciprocation of the guns, or the reciprocation of the guns is too slow for the speed of the workpieces, so that parts of the leading and trailing ends of a workpiece are missed. This can be avoided by suitably adjusting the positions of the scanner points to provide for the proper leading and trailing oversprays. For example, by moving the points $A_1$ and $A_2$ from their dotted position as shown by reference numeral 34 in FIGURE 4A to the right thereof, the leading horizontal overspray is increased by a distance $H_{1'}-H_1$, while the trailing horizontal overspray $H_t$ remains the same. Similarly, by moving points $A_2$ and $A_3$ in an upward direction, to the positions shown in FIGURE 4A, the top vertical overspray is decreased by the distance $V_t-V_{t'}$, while the bottom vertical overspray $V_b$ remains unchanged. All points can be similarly changed to give any overspray pattern desired.

*Structure*

FIGURES 5 through 14 illustrate one physical embodiment of the invention. In particular, FIGURES 5, 6, and 7 illustrate mechanical means for scanner reciprocation. This apparatus may be similar to that used to reciprocate the spray guns. A housing 35 has a vertical slot 36 on one side through which a support arm or rod 37 extends to carry a scanner plate 38. A carrier 39 supports the rod 37 and has rollers 40 to travel in grooves 41 of a vertical runner plate 42. The latter extends the height of the housing 35. A pair of sprockets 43 and 44 are journalled for rotation in the housing 35 and connect to one another by a link chain 45. The carrier 39 has a lubricated groove 105 in which a slide 106 travels. A pin 107 secures the slide 106 to the chain 45, so that when sprocket 44 is turned by a shaft 46, the slide 106 shifts from one flight of the chain to the other as the carrier 39 rounds a sprocket 43 or 44. In this manner, the scanner plate 38 is reciprocated vertically while spaced the same relative distance from the housing 35.

FIGURES 8 and 9 illustrate the scanning plate or frame 38. The latter uses a series of beam-sensitive devices such as light-sensitive photoelectric cells as the activating or sub-reference points. Means sensitive to infrared waves, radioactive, or radio waves could be used instead. In the embodiment illustrated, the plate 38 has a plurality of receptacles 47 into which photoelectric or photocells 48 are secured. Each photocell has a light-sensitive bridge or patch 48a, usually maintained in an evacuated envelope, which is connected in parallel as by conductors 49 and 50 to a commonly applied electromotive force. The conductors are suitably insulated from each other and from the conductors of companion photocells, although the conductors may be grouped together if desired for convenience in a large flexible conduit 108. The photoelectric cells may be of the photoemissive, photovoltaic, or photoconductive types, suitable amplifying means being employed where needed in a manner known in the art. Photoconductive cells have been found particularly suited for the described purpose. Such cells may contain selenium, cadmium sulfide, thallous sulfide, lead sulfide, or silicon as the light-sensitive means as will be known to those skilled in the art.

A scanner of the type illustrated in FIGURES 8 and 9 is capable of varied performance. The comparable locations of the main reference points A and B are indicated. Only the four corners of the sections of the plate associated with these points need have a photocell or other beam sensitive device, so that the scanner resembles the symmetrical disposition of FIGURES 3 and 4. However, the photocells can be moved as well from one position to another so that unsymmetrical disposition is obtained, all to vary the actuation and performance of the gun or guns associated with a main reference point. Further, more or fewer sub-reference points than four can be used, and indeed the entire 36 indicated positions for each reference point can, if desired, be filled with photocells or beam sensitive device to make the plate quite sensitive to passing workpieces. A high multi-point scanner is recommended for sensing relatively small or thin workpieces, such as post caps, molding strips, and the like, which are hung horizontally or angularly on a work holder with wide spaces between each workpiece. In such an instance the scanner should include additional activating points to the four illustrated in FIGURES 3 and 4. The additional activating points prevent possible "straddling" of a workpiece by the sub-reference points and assure the correct interception of rays, thereby properly to control operation of the guns as the scanner traverses a workpiece. Otherwise, a small workpiece could slip between sub-reference points without detection even though such reference points were being vertically reciprocated.

FIGURES 10 to 13 illustrate a modified scanner in which the bar 37 terminates in a vertical arm 51 carrying two T-slotted runners 52. A strip 53 has receptacles 54 in which photocells 55 with patches 55a are carried in the manner of the plate 38 of FIGURES 8 and 9. Each strip 53 has T-shaped lugs 56 which fit in the slots of the runners 52. Conductors 57 and 58 connect to each photocell 55 and are insulated from each other and the conductors of other photocells as before. One or more photocells 55 can be selectively used in each strip as in the plate 38. In addition, each strip 53 can be bodily moved within a T-slot of a runner 52, so that the timing of the overspray can be altered without affecting the spacing between the photocells themselves.

In order for the reference points A and B and the activating or sub-reference points to occupy the same position relative to the moving workpieces as the paint deposition issuing from the corresponding gun or gun sets, it is necessary that the guns and scanner device be reciprocated in unison. A mechanical arrangement for effecting this synchronism is shown in FIGURE 14 wherein the normal installation of two spaced-apart spray gun housings are indicated. The workpieces pass between the spray gun stations, so that both sides of the workpieces are painted. The scanner mechanism indicated at 59 and the housings 60 and 61 for vertically reciprocating the spray guns may all be constructed like the housing 35 of FIGURES 5, 6, and 7. The lower sprockets 59a and 60a of the scanner 59 and housing 60 are interconnected by the shaft 46. A motor 62 conventionally drives the shaft 46 through sprockets 63 and 64 and a connecting link chain 65. Similarly, shaft 46 turns the lower sprocket 61a of housing 61 by a sprocket 66 mounted on a shaft 67, a sprocket 68 mounted on the shaft 46, and an interconnecting link chain 69a.

Operation

The operation of one form of the invention is illustrated by the circuit diagram of FIGURE 15. In this instance, only half of a scanner mechanism 70 is shown, it being understood that a similar circuit may be used for the remaining or right-hand half. The main reference point C corresponds in position and location with respect to the passing workpieces W to a point of paint deposition of a spray gun 69. The main reference point C has one or more sub-reference points $C_1$ in vertical alignment and one or more sub-reference points $C_2$ also in vertical alignment. The points $C_1$ and $C_2$ are photoelectric cells which are adapted to operate the gun 69 so as to provide overspray for all edges of the workpieces W in a manner previously described. The reciprocating machine 70 like the machine of FIGURES 5 and 6 traverses the points $C_1$ and $C_2$ vertically before two light sources. Conveniently, such sources may take the form of long fluorescent tubes 71 and 72, stationed vertically and oppositely to the photocells. Slotted housing 71a and 72a may encompass the tubes to direct beams of light 73 and 74, respectively, toward the photocells and across the path of the workpieces.

As long as the beams 73 and 74 are uninterrupted, no workpiece is detected and the gun 69 cannot be fired. When one or both of the beams 73 and 74 are broken, a circuit is completed to record a signal or impulse, the recordation of which continues until both beams are again uninterrupted. The recorded signals are then used to fire the gun 69 continuously when and as the workpiece reaches it, so as to provide an overspray around the periphery of the workpiece. In a like manner, if the workpiece has an opening or aperture, the guns are similarly triggered to provide an overspray with respect to the perimeter of such opening.

In particular, when beam 73 is broken, a current otherwise continuously flowing in a circuit consisting of a direct-current source 75, conductors 76 and 77, photocell $C_1$, conductor 78, electro-magnetic coil 79, and conductor 80 is interrupted. This de-energizes the coil 79 and permits a normally closed relay switch 81 to leave an open position shown by a dotted line and return to a closed position forming part of a secondary circuit. This circuit consists of a direct-current source 82, conductor 83, relay switch 81, conductor 84, recording head 85 in a recording and "pick-off" box, generally indicated at 102, and conductor 86. The head 85 records an electric impulse or signal from the described secondary circuit on a tape 87. In quite the same manner, when beam 74 is interrupted, current stops in a circuit consisting of a direct-current source 75, conductors 76 and 88, photocell $C_2$, conductor 89, coil 90, and conductors 91 and 80. Consequently, a current flow results in a secondary or auxiliary circuit consisting of a direct-current source 82, conductor 92, normally closed relay switch 93, conductors 94 and 84, recording head 85, and conductor 86, also to record an electric signal on the tape 87.

When either of the auxiliary circuits is closed, the recording head 85 impresses a signal on the tape 87 in a conventional manner. This action is based upon the magnetic action of a recording head with a strip of tape having the capability of permanently maintaining magnetic flux patterns which are established by a suitable recording head until these patterns are erased. The recording head 85 may, if desired, be a group of two recording heads spaced side-by-side with respect to the movement of the tape in order to record the signals from either of the two sets of scanning points and to operate different guns. The continuous tape 87 is trained around rollers 95, 96, 97, 98, 99, 100, and 101, one of which is suitably driven. After a particular point on the tape 87 has passed the recording head 85, a predetermined length of tape is established which creates the necessary time delay before firing of the spray gun 69. This corresponds to the length of time that a workpiece needs to pass from the scanner device or reference point C to the spray painting station. It can be controlled in the recording and pick-off box 102 by suitably driving the tape 87 through one of the indicated rollers.

A pick-off head 103 is stationed aside the tape 87 and may comprise one or more different segments corresponding to one or more paths of signals recorded by the head 85. The signals or impulses recorded on the tape 87 produce a current in the conductors 104 by means of the pick-off head 103. The resulting current energizes a solenoid 110. Activation of the solenoid fires the gun 69 in a well-known manner, as by opening an air-pressure line leading to the gun. For a description of amplifiers and other attendant apparatus which may be used in the circuitry of FIGURE 15, reference is made to the cited Patent No. 2,754,795.

The same tape may pass consecutively by two or more pick-off heads 103 stationed within the same box 102. Thus, the same tape may be used to activate the guns in two or more spray booths. This is particularly useful in an arrangement such as that shown in FIGURE 14 where tandem-spaced spray gun stations are employed to paint both sides of a workpiece. The time needed for a workpiece to pass from one spray gun station to the next is commensurate with that needed for the tape to pass from one pick-off head to another. In any case, the tape 87 passes by an eraser head 111 before again having signals recorded thereon by the head 85.

As indicated in FIGURE 15, the photocells are preferably connected in parallel and each cell has its own relay. However, it is possible to connect the cells in series so as to use only a singe relay. The chief objection to the latter arrangement is that the resistances become additive, and where many photocells are used, the total resistance may become prohibitive.

It will now be apparent that I have provided an improved method and apparatus for spray painting. The present paint control system provides a controlled amount of overspray and accommodates a succession of workpieces varying in size and shape. This is accomplished by synchronizing in speed and path of movement a scanner or detector element with the reciprocating spray unit, and so utilizing the detections obtained that the guns of the unit fire in exactly the same relative positions and time as the workpiece is detected by the scanner device.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In apparatus for spray painting a series of moving workpieces by a spray gun adapted to be reciprocated relatively to the workpieces, operating means for the gun including a detector stationed ahead of the spray gun and having a reference point substantially corresponding to the position of the gun, detector elements on the detector spaced from the reference point, means to move the detector in synchronism with the spray gun, and means to operate the spray gun in accordance with the detections made by said detector elements to provide a controlled overspray to paint each workpiece and edge portions thereof.

2. In apparatus for spray painting a series of workpieces moving along a general path of travel by a spray gun adapted to be reciprocated substantially angularly to such path of travel, operating means for the gun including a sensing device stationed along the path of travel ahead of the spray gun and having a reference point substantially corresponding to the position of the gun with respect to said workpieces, detector elements on the sensing device spaced from the reference point and adapted to detect the passage of a workpiece, means to move the sensing device in sychronism with the spray gun, and means to operate the spray gun in accordance with the detections to maintain the gun in operation for a sufficient period to paint said detected workpiece.

3. In apparatus for spray painting a series of workpieces moving seriatim along a general path of travel by a spray gun adapted to be reciprocated substantially angularly to the path of travel, operating means for the gun including a scanner device stationed along the path of travel ahead of the spray gun and having a reference point corresponding substantially to the position of the gun with respect to said workpieces, electro-detector elements on the scanner device spaced from the reference point and adapted to detect the passage of workpieces past the scanner device, means to move the scanner device in synchronism with the spray gun, and means to fire the spray gun in accordance with the detections as the detected workpieces reach the gun to provide sufficient overspray to paint completely the workpieces.

4. In apparatus for spray painting a series of workpieces moving seriatim along a general path of travel by a spray gun adapted to be reciprocated substantially angularly to the path of travel, operating means for the gun including a scanner device stationed along the path of travel ahead of the spray gun and having a reference point substantially corresponding to the position of the gun with respect to said workpieces, electro-detector elements on the scanner device spaced from the reference point and adapted to detect the passage of workpieces past the scanner device, means to move the scanner device in synchronism with the spray gun, means to complete an electric circuit by the detector elements upon detecting a workpiece, and responsive means in the electric circuit to actuate the spray gun in accordance with the detections as the detected workpiece reaches the gun to provide a controlled overspray to paint completely the workpiece and edge portion thereof.

5. In apparatus for spray painting a series of workpieces moving seriatim along a general path of travel by a spray gun adapted to be reciprocated substantially angularly to the path of travel, operating means for the gun including a scanning device stationed along the path of travel ahead of the spray gun and having a reference point substantially corresponding to the position of the gun with respect to said workpieces, a device on the scanning device sensitive to a beam of energy and spaced from the reference point to detect the passage of workpieces, an energy beam emitter spaced from the scanning device on the other side of said path of travel normally to impinge upon the beam sensitive device, means to move the scanning device in synchronism with the spray gun, means responsive to interruption of the beam by a workpiece passing the scanning device to provide an electric impulse, recording means to record the electric impulse on a tape, means to move the tape commensurately with the movement of the detected workpiece to operate the spray gun as the detected workpiece reaches it, and means responsive to the recorded impulse to actuate the spray gun and paint said detected workpieces and to provide overspray for the edge portions thereof, the amount of such overspray being a function of the spacing of said beam sensitive device from said reference point.

6. Apparatus as claimed in claim 5 wherein a beam sensitive device and an energy beam emitter are spaced both downstream and upstream of the reference point on the scanning device with respect to the general direction of travel of the workpieces to operate the spray gun for a sufficient period to provide overspray about the leading and trailing edges of the detected workpiece.

7. Apparatus as claimed in claim 5 wherein a beam sensitive device is spaced both above and below the reference point to operate the spray gun for a sufficient period to provide overspray about the upper and lower edges of the detected workpiece during the angular reciprocation of the spray gun.

8. Apparatus as claimed in claim 5 wherein the beam sensitive device comprises a plurality of photoelectric cells, and the energy beam emitter is adapted to emit light toward said cells.

9. Apparatus as claimed in claim 5 further including a plurality of such beam sensitive devices and means adjustably to position said devices with respect to the reference point to vary the time of actuation of the spray gun.

10. Apparatus as claimed in claim 5 wherein the scanning device includes a support bar having a T-slot and a beam sensitive device includes a strip adapted to be inserted in the T-slot and having a plurality of spaced photoelectric cells.

11. Apparatus as claimed in claim 10 wherein the spaced photoelectric cells can be selectively used to vary the time of actuation of the spray gun.

12. Apparatus as claimed in claim 5 wherein the scanning device comprises a plate member and the beam sensitive device comprises a plurality of photoelectric cells on the plate member, and the beam emitter comprises a plurality of light sources impinging upon said cells, and further including electro-conducting means connected in parallel to the photoelectric cells whereby said cells can be selectively used to vary the time of actuation of the spray gun.

13. In apparatus for spray painting a series of workpieces moving seriatim along a general path of travel by a plurality of spray guns generally spaced along the path of travel and bodily reciprocated substantially transversely of said path, operating means for the guns including a sensing device stationed along the path and ahead of the spray guns and having reference points each corresponding to the point of spray deposition of at least one of the guns with respect to said workpieces, said reference points being spaced with respect to each other in substantially the same juxtaposition as their corresponding spray guns are spaced, at least one activating element on the sensing device spaced from each of the reference points to detect a workpiece as it passes the element in traveling toward the spray guns, means to move the scanning device at a speed and in a path corresponding to the speed and path of the reciprocation of the spray guns, and means to operate each gun in sequential order in accordance with the detection received by its corresponding activating element.

14. In apparatus for spray painting by a reciprocable movable spray gun, operating means for the gun including a detector spaced ahead of the spray gun and having a reference point substantially corresponding to the position of the gun with respect to a workpiece to be sprayed, a detector element on the detector spaced from said reference point, means to move the detector in synchronism with the spray gun, and means to operate the spray gun in accordance with the detections made by said detector element to paint said detected workpiece with a controlled amount of overspray.

15. In spray painting by reciprocating a solenoid-operated spray gun substantially angularly to the general direction of travel of a plurality of workpieces moving seriatim, the method of controlling overspray for the edge portions of such workpieces comprising the steps of similarly moving a reference point in synchronism with the spray gun and at substantially the same position relatively to the workpiece as occupied by such gun, spacing electro-detector elements on opposite sides of the reference point a variable distance that is proportional to the amount of overspray desired for a workpiece, completing an electrical circuit by means of the electro-detector elements upon sensing the passage of a workpiece past said elements, recording the electro-detections as a signal on a tape, moving the tape commensurately with the movement of the detected workpiece continuously to operate the spray gun as the detected workpiece reaches it, and then operating the gun from the recorded signal on the tape to paint the detected workpiece and provide a controlled overspray in accordance with such variable spacing of the electro-detector elements from such reference point.

16. The method of claim 15 wherein the step of spacing the electro-detector elements includes spacing said elements downstream and upstream of the reference point with respect to the general direction of travel of the workpiece to operate the spray gun for a sufficient period to provide controlled overspray as defined about the leading and trailing edges of the detected workpiece.

17. The method of claim 15 wherein the step of spacing the electro-detector elements includes spacing said elements above and below the reference point to operate the spray gun for a sufficient period to provide controlled overspray as defined about the upper and lower edges of the detected workpiece during the angular reciprocation of the spray gun.

18. In the method of spray painting by reciprocating a spray gun relatively to a workpiece moving along a path of travel, the steps of reciprocating a reference point in synchronism with such spray gun so that the point and gun always bear the same transverse relation with respect to such path of travel, spacing detecting means relatively to such path a given distance on at least two sides of the reference point, reciprocating the detecting means relatively to such path of travel in synchronism with the spray gun and reference point, detecting the passage of a workpiece past the detecting means, using such detections continuously to operate the spray gun, and controlling the period of such continuous operation by the extent of such given distances the detecting means are spaced from the reference point, whereby a predetermined controlled amount of overspray is provided for such workpiece.

19. In the method of spray painting by reciprocating a spray gun substantially angularly to the general direction of travel of a plurality of workpieces moving seriatim, the improvements comprising the steps of reciprocating a reference point in synchronism with such spray gun so that the point and gun always bear the same transverse relation with respect to such path of travel, spacing electro-detecting means a variable distance on opposite sides of the reference point, reciprocating such detecting means relatively to such path of travel in synchronism with the spray gun and reference point, detecting the passage of a workpiece past the electro-detecting means, using such detections continuously to operate the spray gun as the detected workpiece reaches the spray gun, and controlling the period of such continuous operation by varying at least one of such distances a detecting means is spaced from the reference point, commensurately to vary the period of gun operation for that portion of the workpiece moving along such path which corresponds to the position the so-varied detecting means bears to the reference point, whereby a predetermined controlled amount of overspray is provided for such workpiece.

References Cited in the file of this patent
UNITED STATES PATENTS

| | | |
|---|---|---|
| 1,966,093 | Griffin | July 10, 1934 |
| 2,383,023 | Sykes et al. | Aug. 21, 1945 |
| 2,754,795 | Enssle | July 17, 1956 |